United States Patent

Carrier

[15] 3,680,364
[45] Aug. 1, 1972

[54] MONITORING HUMIDITY

[72] Inventor: Roger E. Carrier, 2029 N. Oak Lane, State College, Pa. 16801

[22] Filed: June 22, 1970

[21] Appl. No.: 48,280

[52] U.S. Cl. ..............................73/73, 116/114 AM
[51] Int. Cl. ............................................G01n 33/00
[58] Field of Search ............73/73, 335; 116/114 AM

[56] References Cited

UNITED STATES PATENTS

| | | | |
|---|---|---|---|
| 3,019,638 | 2/1962 | Klein | 73/73 |
| 2,249,867 | 7/1941 | Snelling | 73/335 |
| 2,446,361 | 8/1948 | Clibbon | 73/73 UX |
| 3,425,388 | 2/1969 | West | 73/73 X |
| 2,460,065 | 1/1949 | Davis | 73/335 X |

*Primary Examiner*—Jerry W. Myracle
*Attorney*—Gray, Mase and Dunson

[57] ABSTRACT

An indicator that changes color with humidity is enclosed by a transparent window that is impermeable to moisture and a base membrane that is permeable to moisture and impermeable to bulk liquid. The membrane is maintained in contact with concrete during its curing, and water is added when the indicator shows the relative humidity in the concrete to be too low.

12 Claims, 3 Drawing Figures

PATENTED AUG 1 1972 3,680,364

INVENTOR
ROGER E. CARRIER

BY GRAY, MASE & DUNSON
ATTORNEYS

BY Philip M. Dunson

MONITORING HUMIDITY

BACKGROUND OF THE INVENTION

This invention relates to devices for indicating relative humidity in surface regions of masses of moisture-containing material. Devices according to the invention typically are at least partially embedded in, or mounted on a surface of, such material. One widespread need that is now especially well served by the present invention is for monitoring the humidity in partially set concrete and the like.

Strength of concrete is closely related to the extent of hydration of the cement therein. A moist curing environment or one that impedes evaporation of moisture generally allows a higher extent of hydration and yields a stronger concrete than a dry or high moisture loss environment. Portland Cement does not hydrate at or below a relative vapor pressure of about 80 percent.

Relative humidity is defined as the ratio of the partial pressure of water vapor in the atmosphere to the partial pressure that would cause saturation at the temperature of the atmosphere. Hence, relative humidity and relative vapor pressure are directly related by definition. In 1947, Powers and Brownyard discussed the effect of self-desiccation on the rate of hydration for Portland Cement. (Powers, T. C. and Brownyard, T. L., "Studies of Physical Properties of Hardened Portland Cement Paste," J. Am. Conc. Inst., April 1947, pp. 986–987.) Self-desiccation is the process by which the pores in the cement paste become partially emptied when a specimen is kept sealed after its bleeding period so that no extra water is available during the course of hydration. The authors pointed out that:

"Self-desiccation influences the rate of hydration. As the pores become partly emptied, the vapor pressure of the remaining evaporable water is correspondingly reduced. Experiments indicate that even though the remaining water is chemically free, its rate of reaction with cement is a function of its relative vapor pressure. If the relative vapor pressure in the paste drops below about 0.85, hydration virtually ceases. Consequently, sealed specimens hydrate more slowly than those having access to water, and they may never reach the ultimate degree of hydration possible when extra water is available. This has a bearing on the efficiency of membrane or seal-coat curing."

In a later publication, the same authors pointed out that hydration generally ceases if the relative humidity within the cement paste is less than about 80 percent. (Powers, T. C. and Brownyard, T. L., "Studies of the Physical Properties of Hardened Portland Cement Paste," Research Laboratories of the Portland Cement Association, Bulletin 22, March, 1948.)

A major problem in controlling hydration is to determine the moisture content of curing concrete, particularly at or near the surface. To be satisfactory, any moisture test must be accomplished easily and must not require expensive or complicated equipment. The test must be performed at the job site by concrete inspectors; and it must be performed at many locations on each structure in order to insure that the design-specified curing procedures are being executed properly. The inspectors have little time to tinker with complex equipment or time-consuming readings.

The relative humidity gage of this invention can be used to indicate the moisture content at any desired depth in the concrete at any time during the life of the concrete. Moisture content can be read by simply observing the color of inexpensive relative humidity "buttons" strategically placed in the concrete structure (pressed in with the thumb) at the time of pouring. The gage has been useful also in testing the moisture-retaining efficiency of membrane forming curing compounds widely used in current highway pavement construction.

One practical use of the invention comes from the continued interest in quality concrete construction. The quality of concrete constructions come from the basic mix design and the care afforded to handling of the concrete in terms of placing, properly curing, controlling the environment at early stages, etc. The invention yields a fast check on the adequacy of the curing procedures at the surface. Since the surface is usually the first to be improperly cured, the device is a very useful indicator of the adequacy of curing for the whole construction.

The invention is very useful also as a research tool. In studies where an indication of continued hydration is necessary, an indication of critical relative humidity is sufficient.

Prominent among the present humidity indicators is the Monfore gage developed at the Portland Cement Association laboratory. The gage is a small probe-type relative humidity gage, which uses a Dacron thread as the moisture sensitive element. The changes in length of the Dacron thread due to changes in relative humidity are measured by determining the resulting resistance changes in a fine advance wire which is attached to the thread. Although the gage is relatively simple, the necessary equipment to sense the rather small changes in resistance limits its use largely to laboratory work.

Another way of determining the relative humidity and also the state of the water, i.e., liquid water, physically adsorbed water, interlayer of zeolite water, and chemically combined water is by nuclear magnetic resonance techniques.

In essence, a sample is subjected to electromagnetic radiation while in a very strong and highly homogeneous magnetic field. The strength of the field determines the narrow range of frequencies in which the electromagnetic absorption spectrum occurs. For a given absorption peak, a change in field strength causes a predictable shift in the resonance frequency. For solids, and for water in porous materials, weak and broad spectra are obtained, in contrast to the narrow peaks shown by liquids. A detailed description of this technique is provided by Seligmann. (Seligmann, P., "Nuclear Magnetic Resonance Studies of the Water in Hardened Cement Paste," Journal of the PCA Research and Development Laboratories, January, 1968.) It is also a laboratory technique.

In addition, a technique based on measurement of electrical conductivity of concrete between two electrodes has been used in the field and in the laboratory. (Horby, I. W., "The Measurement of Moisture in Mass Concrete," Central Electricity Research Laboratories, CERL Note No. RD/L/N40/67, May 16, 1967.) This technique is not dependable since the concrete, upon curing, shrinks away from the electrodes and gives a false impression of the conductivity of the concrete.

Some pocket indicators of the relative humidity of cavities are available, but they are not reliable for a determination of the relative humidity of the paste.

It has been mentioned above that cement stops hydrating when the relative vapor pressure in concrete drops below about 80 percent. In other words, curing essentially ceases when concrete dries below this limit. In an effort to find a simple test of concrete curing effectiveness, researchers at The Pennsylvania State University have measured the internal relative humidity of curing concrete. This has led to a better understanding of the internal moisture conditions under pavement membrane-forming curing compounds, and to the simple curing effectiveness gage of the present invention for use in field-placed concrete.

Engineers associated with pavement construction have shown concern about non-uniform applications of curing compounds. In the Penn State experiments, simulated pavement slabs were cured under various thicknesses of membrane-forming curing compound. Drying in the slabs was monitored using a relative humidity technique. The relative humidity was measured with Monfore gages in precast wells at various depths below the surface of the slabs. Approximately one hundred 8 × 8 × 2 in. thick slabs were sprayed with various applications or thicknesses of white pigmented curing compound. The slabs were exposed to a simulated field environment for 14 days. During this period, relative humidity measurements were made; and at the end of the test period, relative surface strengths were measured using the Schmidt hammer.

The experimental results clearly showed that heavier applications yielded higher relative surface strengths. The abrasion resistance, as determined qualitatively with a grinding wheel, also increased markedly with increased application rates.

Moisture distribution with depth was also obtained. These data indicated that only the upper inch of concrete is in danger of drying below the critical hydration limit (80 percent) in 28 days. Alterations in the surface curing had little effect on the humidity near the interior. However, the upper inch is the most important with respect to the durability, safety, and riding quality of concrete pavement.

Because uniform applications of curing compound are nearly impossible to achieve in the field, and because the upper one inch of concrete pavements is subject to drying, the field relative humidity gage of this invention is a valuable tool for determining curing effectiveness. The gage typically comprises a small, clear plastic "button" with a humidity-indicating chemical adhered to the underside. The button can be pressed into the surface of fresh concrete by inspectors and may remain in place throughout the life of the concrete. If the concrete dries to a level near the critical humidity during the curing period, the button indicates this by changing color. Thus, corrective measures can be taken to insure that hydration continues in the concrete.

SUMMARY OF THE INVENTION

A typical device according to the present invention for indicating relative humidity in a surface region of a mass of moisture-containing material may comprise a base member having such composition and thickness as to be permeable to the passage of moisture while impermeable to bulk liquid and adapted for positioning in contact with the mass; an indicator comprising at least one member having a composition that provides a known visible response to selected relative humidity conditions; and a substantially transparent window member having such composition and thickness as to be substantially impermeable to moisture, hermetically attached to the base member and forming therewith around the indicator an enclosure that is permeable to moisture through the base member and substantially impermeable elsewhere. The indicator preferably is adjacent the base member.

Such a device may be adapted for embedding the base member in partially set concrete and the like with a viewing area of the window member substantially flush with or above a surface of the concrete, and a cover member may be removably adhered to the viewing area of the window member, to facilitate removal of any coating that may be put on the surface. A portion of the device that is nearer the base may protrude outwardly beyond a portion that is nearer the viewing area of the window, so that any concrete above the protruding portion helps to hold the device in place.

The base member preferably comprises a membrane consisting essentially of a polymeric material such as cellulose acetate, regenerated cellulose, ethyl cellulose, silicone rubber, or nylon. For use in curing concrete, the indicator preferably comprises at least one member that provides a response in the range of about 80 to 100 percent relative humidity. Such a member typically comprises a chemical composition that changes color in response to changes in ambient relative humidity. A typical indicator comprises a first member that provides a response to relative humidities of at least about 80 percent, a second member that provides a response to relative humidities of at least about 90 percent, and a third member that provides a response to relative humidities of about 100 percent. The window member preferably consists essentially of a polymeric material such as polyethylene, polyvinyl chloride, nylon, a cellulose ester, or other polyester or polyvinyl compound.

A typical method of using the device in optimizing the curing of a mass of concrete comprises maintaining the base member of the device in contact with the mass during its curing; and adding water to the mass intermittently when the indicator in the device shows the relative humidity in the mass to be below a predetermined level. Where the surface of the concrete is large, a plurality of the devices may be mounted at spaced locations thereon.

The drawings are not to scale or necessarily in true proportions.

DESCRIPTION OF PREFERRED EMBODIMENTS

Figure 1:
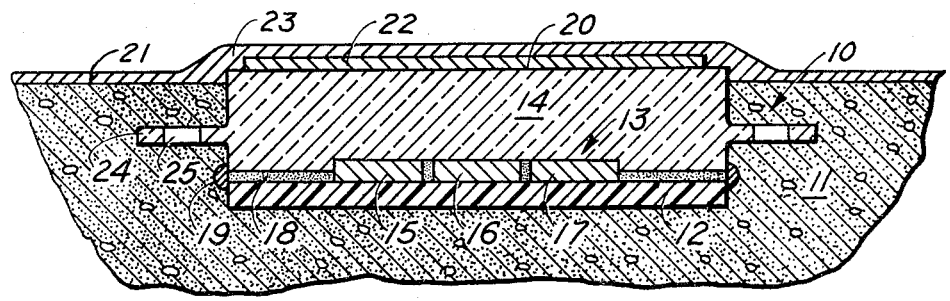
FIG. 1 is a vertical sectional view of a typical humidity indicator device according to the present invention embedded in partially set concrete.
Figure 2:
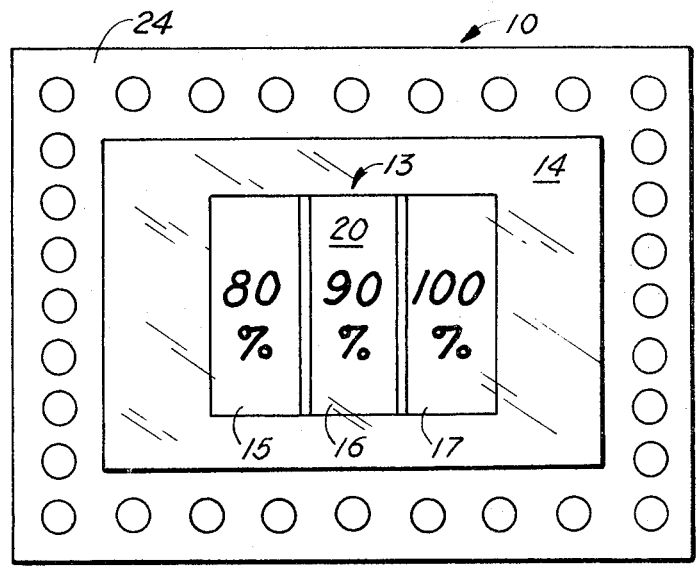
FIG. 2 is a top view of the device alone and with its cover member removed.

Referring to FIGS. 1 and 2, a typical device 10 according to the present invention for indicating the relative humidity in a surface region of a mass 11 of moisture-containing material comprises a base member 12, an indicator 13 adjacent the base member 12, and a window member 14 spaced from the indicator 13. The base member 12 has such composition and thickness as to be permeable to the passage of moisture while impermeable to bulk liquid, and is adapted for positioning in contact with the mass 11, as shown in FIG. 1. The base member 12 typically comprises a membrane consisting essentially of a polymeric material such as cellulose acetates less than about 1 mil thick, regenerated cellulose less than about 1 mil thick, ethyl cellulose less than about 3 mils thick, silicone rubber less than about 1 mil thick, or nylon less than about 0.5 mil thick.

The indicator 13 comprises at least one member, and preferably a plurality of members 15, 16, 17, or more, each having a composition that provides a known visible response to selected relative humidity conditions. Where the device 10 is to be used with concrete, the member 15 should provide a response in the range of about 80 to 100 percent relative humidity if it is the only indicator member. Where three indicator members are employed, the first member 15 preferably provides a response to relative humidities of at least about 80 percent, the second member 16 provides a response to relative humidities of at least about 90 percent, and the third member 17 provides a response to relative humidities of about 100 percent. Where multiple indicator members are employed, each member may be, and desirably is, separately enclosed and separated from the other members by a hermetic barrier. Each indicator 15, 16, 17 typically comprises a chemical composition that changes color in response to changes in ambient relative humidity.

The art contains numerous teachings of humidity-sensing chemical compositions and salts, as well as papers and the like containing these compositions and salts, which undergo a visible color change at a selected relative humidity from about 0 up to about 90 percent and even higher relative humidities. Those humidity-sensing compositions, and especially papers, silica gels, and other inorganic substrates incorporating the appropriate humidity-sensing composition are useful for the indicator 13 and the various indicator members, such as 15, 16, and 17, upon selection therefrom to employ those having the desired and selected specific color change response at the relative humidities expected to be encountered in the particular moisture-containing material with which the device of the invention is to be utilized. Illustrative and representative, but not necessarily inclusive, of such useful indicators, are humidity-sensing compositions, salts, and the like taught by U.S. Pat. Nos. 2,460,065; 2,460,066; 2,460,067; 2,460,068; 2,460,069; 2,460,070; 2,460,071; 2,460,072; 2,460,073; 2,460,074; 2,580,737; and 2,627,505; and publications such as "Cobaltous Chlorides as a Water Vapor Indicator," A. J. Cameron, Chemistry and Industry, March 13, 1965, page 461; "Color Changes Which Occur When Co Thiocyanate Impregnated Paper is Exposed to Air may be Used to Measure Humidity," Chemical Processing (London), November, 1960, page 29; "Estimation of Humidity with Cobalt Thiocyanate Paper and Permanent Color Standards," M. E. Solomon, Bulletin Entomological Research, 48 (1957), pages 489–506; and "Use of Cobalt Salts as Indicators for Humidity and Moisture," M. E. Solomon, Ann. Appl. Biology, 32 (1945), pages 75–78.

In a preferred embodiment of the invention, such as is useful in contact with concrete during its curing, the indicator 13 and its particular member thereof preferably are papers impregnated with the appropriate amounts of $Co(CNS)_2$ providing a color response at the particular desired relative humidity of about 80, 90, and 100 percent, respectively. Solomon's work reported in the aforementioned article in "Bull. Entomological Research" illustrates the high accuracy obtainable in determination of relative humidities using such a cobalt thiocyanate paper as an indicator through careful color matching with standards. In actual field usage of the preferred device, for most purposes, such high accuracy is not needed and the visual color change of the indicator is distinctive enough to provide a practical and useful close approximation of the particular relative humidity being determined. However, a suitable standard color code chart may be used to compare and match visibly with the particular color of the indicator, if more accurate relative humidity readings are desired. In fact, a standard comparison color can be included in the indicator 13 adjacent the changeable areas of the indicator members 15, 16, 17.

The window member 14 comprises a material that is substantially transparent and impermeable to moisture. It is hermetically attached to the base member 12 and forms therewith around the indicator 13 an enclosure that is permeable to moisture through the base member 12 and substantially impermeable elsewhere. The window member 14 typically consists essentially of a polymeric material such as a polyester or a polyvinyl compound. Such materials include polyethylene at least about 4 mils thick, polyvinyl chloride at least about 4 mils thick, nylon at least about 4 mils thick, cellulose esters at least about 4 mils thick, and polyester (such as glycol terephthalate polymer) at least about 0.5 mil thick.

Where the base member 12 and the window member 14 are made of materials that do not bond satisfactorily to each other an interlayer 18 comprising a material, such as a cement or adhesive that adheres both together, or a material that bonds satisfactorily to both of the other materials, may be provided between them. If a wick-like material such as paper is used for the interlayer 18, it may be necessary to surround it with an enclosing band 19 of a substantially moisture impermeable material to avoid absorption of liquid by the paper. Where the materials of the base member 12 and the window member 14 can be satisfactorily bonded directly to each other, as by heat sealing, the interlayer 18 and the enclosing band 19 may be omitted from the device 10 of FIGS. 1 and 2.

In FIG. 1 the device 10 is shown with the base member 12 embedded in partially set concrete or the like with a viewing area 20 of the window member 14 substantially flush with or slightly above the surface 21 of the concrete 11.

A cover member 22, such as a peelable adhesive tape, label, or the like, may be removably adhered to the viewing area 20 of the window member 14 to facilitate removal of any coating that may be put on the surface, such as a typically opaque coating 23 that may be placed on the surface 21 of the concrete to retard evaporation during the curing of the concrete 11. A portion of the device 10 that is nearer to the base 12, such as a rim 24 with perforations 25, may protrude outwardly beyond a portion that is nearer to the viewing area 20 of the window 14, so that a portion of the mass of concrete 11 above the rim 24 will help to hold the device 10 securely in place.

Figure 3:
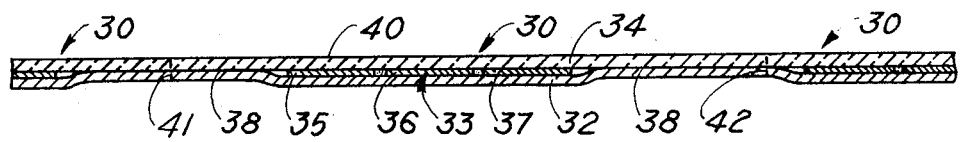
FIG. 3 is a vertical sectional view of another typical form of device according to this invention.

FIG. 3 shows a slightly modified and somewhat simpler device 30 for indicating relative humidity, comprising a base member 32, an indicator 33, and a window member 34. The indicator 33 may comprise indicator members, 35, 36, 37, as described above in connection with FIGS. 1 and 2. The base member 32 and the window member 34 may comprise films of suitable materials as described above in connection with FIGS. 1 and 2. The window member 34 is hermetically attached to the base member 32, as indicated at 38, and forms therewith around the indicator 33 an enclosure that is permeable to moisture through the base member 32 and substantially impermeable elsewhere.

As is apparent from FIG. 3, a plurality of the devices 30 may be fabricated in continuous strips or wider areas of any convenient size, to be cut apart as indicated at 41, 42 when desired.

Devices 30 as in FIG. 3 typically are pressed barely into or snugly on the surface of partially cured concrete and may be held in place by adhesive around the periphery or other suitable means, if desired. A cover member, not shown in FIG. 3, may be provided over the viewing area 40, if desired, as in FIG. 1. Otherwise any coating spread over the surface of the concrete can be scraped away from the viewing area 40. A device 10 as in FIG. 1 may be placed on or in a concrete mass in similar ways. If the concrete is soft enough at the time, the device 10 may be pressed down far enough to become substantially embedded in the concrete mass 11. The holes 25 in the rim 24 enable the concrete to fit snugly around and against the device 10.

A typical method of using a device 10, 30 in optimizing the curing of a mass of concrete 11 comprises maintaining the base member 12, 32 of the device 10, 30 in contact with the mass 11 during its curing, and adding water to the mass 11 intermittently, as by spraying water thereon or flooding water onto the mass, when the indicator in the device 10, 30 shows the relative humidity in the mass 11 to be below a predetermined level, such as 80 percent or 90 percent, depending on the stage in the curing process and any other relevant factors. Of course more than three indicator members may be used where desired to provide greater accuracy in measuring the changes in the relative humidity and thus to permit finer control of the humidity. Where large surface areas are involved, a plurality of the devices 10, 30 are mounted at spaced locations on the mass 11.

Another method for using the device 10 is for monitoring humidity in concrete over long periods of time. The window member 14 should be quite thick so that the indicator 13 can be located several inches below the surface of the concrete with the top of the window member 14 approximately flush with the surface. This may be of value in determining the best times for applications of linseed oil or other moisture impeding agents, or for other uses such as determining the draining effectiveness of a subgrade material.

To illustrate in detail a specific embodiment of a device of the invention and its fabrication, a one-fourth by one-half inch cobalt-thiocyanate-surfactant-impregnated-paper indicator was placed between, and centrally located in, a sandwich of a one-half mil thick, 2 by 2 inches film of nylon (base member) and a one-half mil thick sheet of polyethylene terephthalate (window member); and the edges of the film and sheet were heat sealed together using a standard commercial impulse heat sealer to enclose the indicator and to hermetically seal the film and sheet together near their edges. The indicator was provided by preparing by air drying a No. 42 ashless anayltical filter paper which had been immersed in an aqueous composition, removed, and air dried. The aqueous composition was obtained by mixing aqueous solutions of about 20 percent by weight of $CoCl_2 \cdot 6H_2O$, 7.5 percent by weight of ammonium thiocyanate, 26 percent by weight of a nonionic surfactant, and water, to provide a stock solution of the aqueous composition containing about 1.8 percent by weight of cobaltous ion. The resulting cobalt-thiocyanate-surfactant-impregnated paper indicator had visible color change at about 90 percent relative humidity, being blue at lower humidities and pink at high humidities. The device was conditioned at about 80 percent relative humidity for about 1 day with its impregnated paper indicator showing a blue color. Thereupon the device was placed so as to expose its moisture-permeable nylon base member to 90 percent relative humidity and within 4 to 6 hours its impregnated paper indicator took on a pink color. Where faster response to humidity change is required, the thickness of the nylon element is decreased. Also other materials more permeable to moisture have been used as the base member, with faster response.

While the forms of the invention herein disclosed constitute presently preferred embodiments, many others are possible. It is not intended herein to mention all of the possible equivalent forms or ramifications of the invention. It is to be understood that the terms used herein are merely descriptive rather than limiting, and that various changes may be made without departing from the spirit or scope of the invention.

I claim:

1. A device for indicating relative humidity in a surface region of a mass of moisture-containing material, comprising a base member having such composition and thickness as to be permeable to the passage of moisture while impermeable to bulk liquid and adapted for positioning in contact with the mass;

an indicator comprising at least one member having a composition that provides a known visible response to selected relative humidity conditions; and a substantially transparent window member having such composition and thickness as to be substantially impermeable to moisture, hermetically attached to the base member and forming therewith around the indicator an enclosure that is permeable to moisture through the base member and substantially impermeable elsewhere.

2. A device as in claim 1, wherein the indicator is adjacent the base member.

3. A device as in claim 1, with the base member in partially set concrete and with a viewing area of the window member substantially parallel to and flush with or above a surface of the concrete.

4. A device as in claim 3, wherein a cover member is removably adhered to the viewing area of the window member, to facilitate removal of any coating that may be put on the surface.

5. A device as in claim 3, wherein a portion of the device that is nearer the base protrudes outwardly beyond a portion that is nearer the viewing area of the window.

6. A device as in claim 3, wherein the indicator comprises a member that provides a response in the range of about 80 to 100 percent relative humidity.

7. A device as in claim 3, wherein the indicator comprises a first member that provides a response to relative humidities of at least about 80 percent, a second member that provides a response to relative humidities of at least about 90 percent, and a third member that provides a response to relative humidities of about 100 percent.

8. A device as in claim 1, wherein the base member comprises a membrane consisting essentially of a polymeric material.

9. A device as in claim 8, wherein the polymeric material is cellulose acetate, regenerated cellulose, ethyl cellulose, silicone rubber, or nylon.

10. A device as in claim 1, wherein the indicator comprises a chemical composition that changes color in response to changes in ambient relative humidity.

11. A device as in claim 1, wherein the window member consists essentially of a polymeric material.

12. A device as in claim 11, wherein the polymeric material is polyethylene, polyvinyl chloride, nylon, a cellulose ester, or other polyester or polyvinyl compound.

* * * * *